United States Patent
Roussos et al.

(12) 
(10) Patent No.: US 7,657,617 B1
(45) Date of Patent: Feb. 2, 2010

(54) METHOD AND SYSTEM FOR COLLECTING PERFORMANCE RELATED INFORMATION FOR A REMOTE DEVICE

(75) Inventors: Konstantinos Roussos, Sunnyvale, CA (US); Neelesh Madhukar Thakur, Sunnyvale, CA (US); Zdenko Kukavica, Mountain View, CA (US)

(73) Assignee: NetApp, Inc., Sunnyvale, CA (US)

( * ) Notice: Subject to any disclaimer, the term of this patent is extended or adjusted under 35 U.S.C. 154(b) by 652 days.

(21) Appl. No.: 10/802,542

(22) Filed: Mar. 16, 2004

(51) Int. Cl.
*G06F 15/173* (2006.01)

(52) U.S. Cl. .................... 709/223; 709/217; 709/219

(58) Field of Classification Search ................ 709/231, 709/217, 219, 223, 212, 213, 214
See application file for complete search history.

(56) References Cited

U.S. PATENT DOCUMENTS

| 6,513,155 | B1 * | 1/2003 | Alexander et al. .......... 717/124 |
| 6,789,046 | B1 * | 9/2004 | Murstein et al. ............ 702/182 |

\* cited by examiner

*Primary Examiner*—Frantz B Jean
(74) *Attorney, Agent, or Firm*—Perkins Coie LLP

(57) ABSTRACT

In one embodiment, the invention provides a method comprising for each tuple containing a counter and an object; and for at least one remote device in a network that has the particular object and counter contained in the tuple, automatically sampling the counter.

24 Claims, 8 Drawing Sheets

| Performance Object | Counter Name |
|---|---|
| CPU | CPU_Busy |
| disk | disk_kb_written |
| disk | disk_kb_read |
| | |
| | |

FIG. 4

METHOD AND SYSTEM FOR COLLECTING PERFORMANCE RELATED INFORMATION FOR A REMOTE DEVICE

FIELD OF THE INVENTION

At least one embodiment of the invention relates to data storage, and in particular to the collecting of performance information relating to a storage device.

BACKGROUND

As used herein, the term "storage device," refers to any physical host device capable of performing storage related functions. Thus, storage devices include, but are not limited to storage servers (filers), network attached storage (NAS) devices, direct attached storage (DAS) devices, etc. Typically, the storage devices are coupled within a storage network or storage system.

A performance object refers to a logical or physical subsystem of a storage device. For example, the performance objects for a storage device may include disks, volumes, Central Processing Units (CPUs), Host Bus Adaptors (HBAs), Logical Unit Numbers (LUNs), etc.

Typically, a storage device has a number of performance counters to collect performance data relating to each of its performance objects. Examples of performance data include statistical data, system status data, system configuration data, etc. The data collected by the counters is useful in assisting a storage system administrator to identify performance related problems in a storage network. However, often a storage system administrator has no knowledge of the counters available for a storage device, and may further lack the skill to collect data from the counters. Typically, if a storage system administrator finds that there is a storage related problem with a storage system, the administrator contacts a customer support center and obtains a script from the customer support center to collect and view counter data for the storage devices in the storage network, in an attempt to diagnose the cause of the performance related problem. Such an approach is not always successful, since the actual historical data relating to when the performance related problem actually occurred may not have been collected, and may, therefore, not be available.

SUMMARY OF THE INVENTION

In one embodiment, the invention provides a method comprising for each predefined tuple containing a counter and an object; and for at least one remote device in a network that has the particular object and counter contained in the tuple, automatically sampling the counter.

BRIEF DESCRIPTION OF THE DRAWINGS

FIG. 4 shows a mapping table that may be used to practice embodiments of the invention.

DETAILED DESCRIPTION

Embodiments of the present invention relate to a management tool that automatically discovers performance objects, instances of the performance objects, and counters associated with said instances for each remote device/host in a network, and automatically creates instantiations of counters based on a predefined counter group template comprising mappings of performance objects to counters.

The management tool keeps track of all instances of performance objects so that new counters can be automatically instantiated in the case of new instances of performance objects being added, and instantiated counters can be automatically deleted in the case of an existing instance of a performance object being removed.

Advantageously, the management tool allows the network administrator to collect performance data for an arbitrary number of performance objects, without having a priori knowledge of what counters are available for each performance object, and without having to run a specialized script to collect the performance data. Other advantages of embodiments of the invention will be apparent from the detailed description below.

Figure 1:
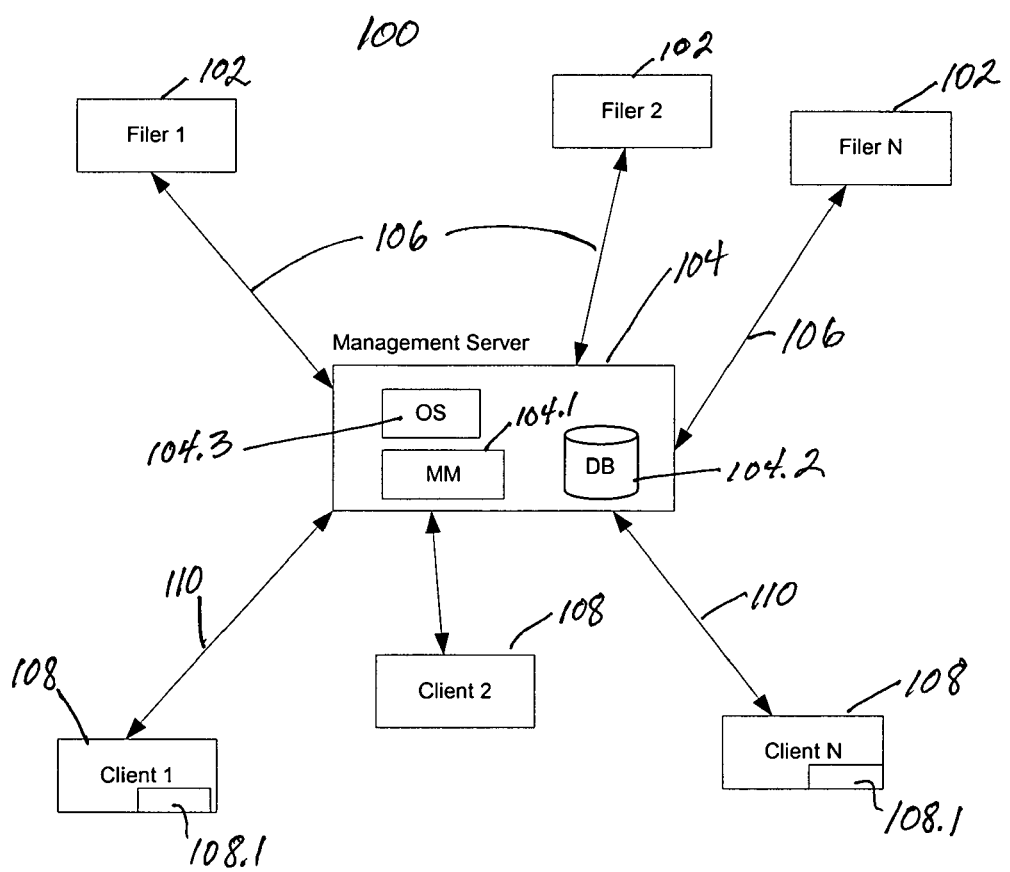
FIG. 1 shows a high level block diagram of a network architecture, within which embodiments of the present invention may be practiced.

Referring now to FIG. 1 of the drawings, reference numeral 100 generally indicates a network architecture, within which embodiments of the present invention may be practiced. As will be seen, the network architecture 100 includes a number of remote devices/hosts 102. The components of each host 102, are described with reference to FIG. 5 of the drawings, below. In one embodiment, each host 102 may be a filer supplied by Network Appliance, Inc. Each host 102 is coupled to a management server 104 via a communications path 106. The communications path 106 may include a transport layer, which supports a transport protocol, for example, the Hypertext Transfer Protocol (HTTP), or the User Datagram Protocol (UDP). Information sent over the transport protocol may be encoded using a variety of protocols, for example, the Simple Network Management Protocol (SNMP), or the Extensible Markup Language (XML).

Figure 5:
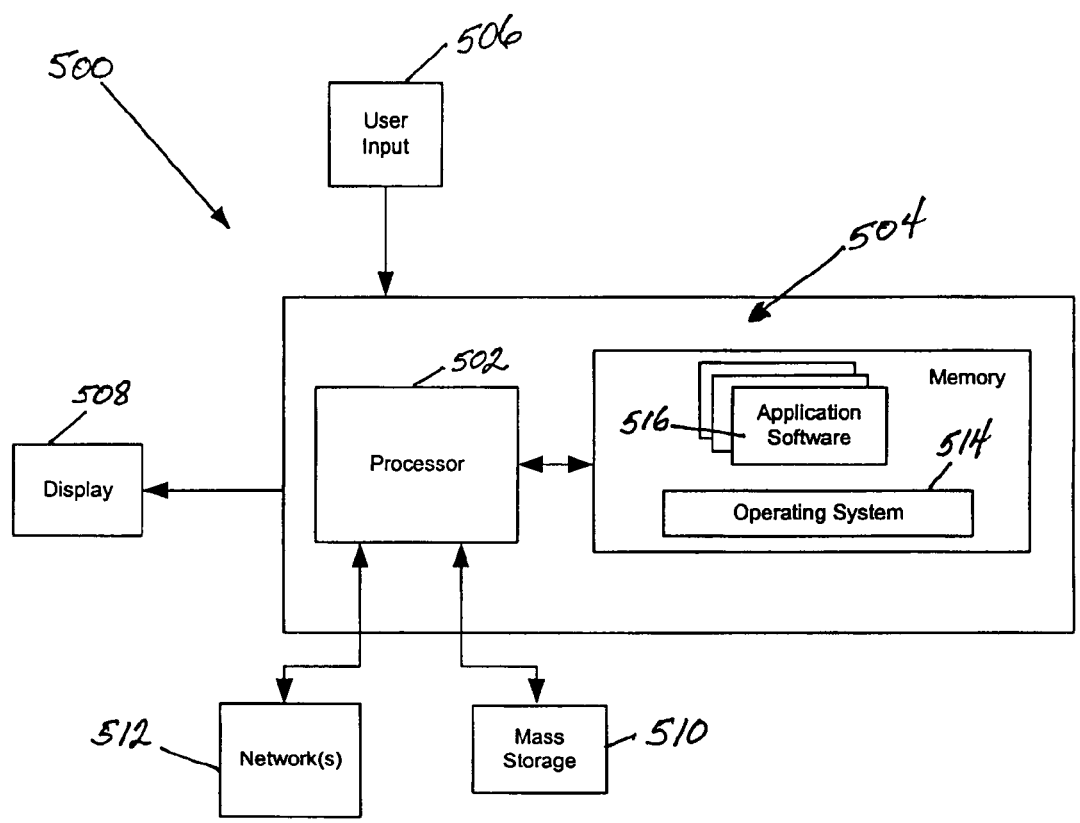
FIG. 5 shows a high level block diagram of hardware that may be used to implement any of the hosts, clients, and the management server, shown in FIG. 1.

The management server 104 may have an architecture in accordance with that shown in FIG. 5 of the drawings. The purpose of the management server 104 is to provide storage management functions to a number of client devices (clients) 108. In order to provide these storage management functions, the management server runs an application 104.1, known as a management module (MM). In one embodiment, the MM may be the DataFabric® product supplied by Network Appliance, Inc. The management server 104 also includes a database 104.2, and an operating system 104.3. In one embodiment, the operating system 104.3 may be, for example, the Solaris, Window, or Linux operating system.

In one embodiment, the clients 108 may have an architecture such as that shown in FIG. 5 of the drawings. Each of the clients includes a client application 108.1, which, in use, invokes one or more Application Program Interfaces (APIs) in order to display performance data collected by the MM application 104.1 as will be described in greater detail below.

Each client 108 is coupled to the management server 104 via a communications link 110. For example, in one embodiment the communications link 100 supports a Remote Procedure Call (RPC) made over a suitable transport protocol, e.g., UDP or HTTP.

Figure 2:
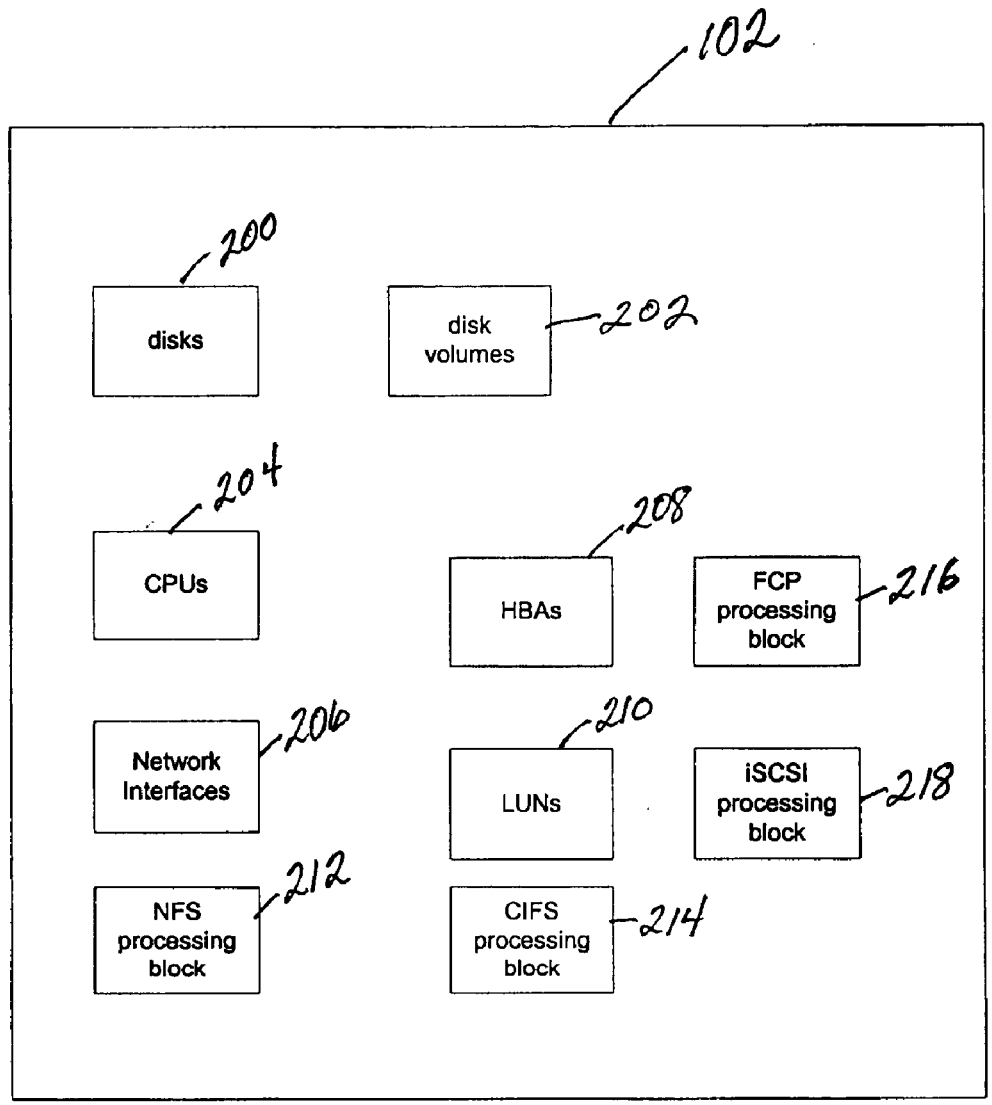
FIG. 2 shows a representation of each of the hosts/filers of FIG. 1 in terms of its logical and physical subsystems.

FIG. 2 of the drawings shows a representation of each of the hosts/filers 102 in terms of its logical and physical subsystems. As will be seen, these logical and physical subsystems may include disks 200, disk volumes 202, Central Processing Units (CPUs) 204, network interfaces 206, Host Bus Adaptors (HBAs) 208, Logical Unit Numbers (LUNs) 210, a Network File System (NFS) processing block 212, a Common Internet File System (CIFS) processing block 214, a Fibre Channel Protocol (FCP) processing block 216, and an Internet Small Computer System Interface (iSCSI) processing block 218. Each of the logical and physical subsystems of the host 102 described above defines a performance object from which performance data may be collected, using one or more performance counters. Typically, the data collected by the performance counters may be used by a storage network administrator to identify problems in the storage network. Examples of counters include counters to measure CPU load, the number of CIFS operations, the number of FCP operations, the number of iSCSI operations, etc.

Figure 3:
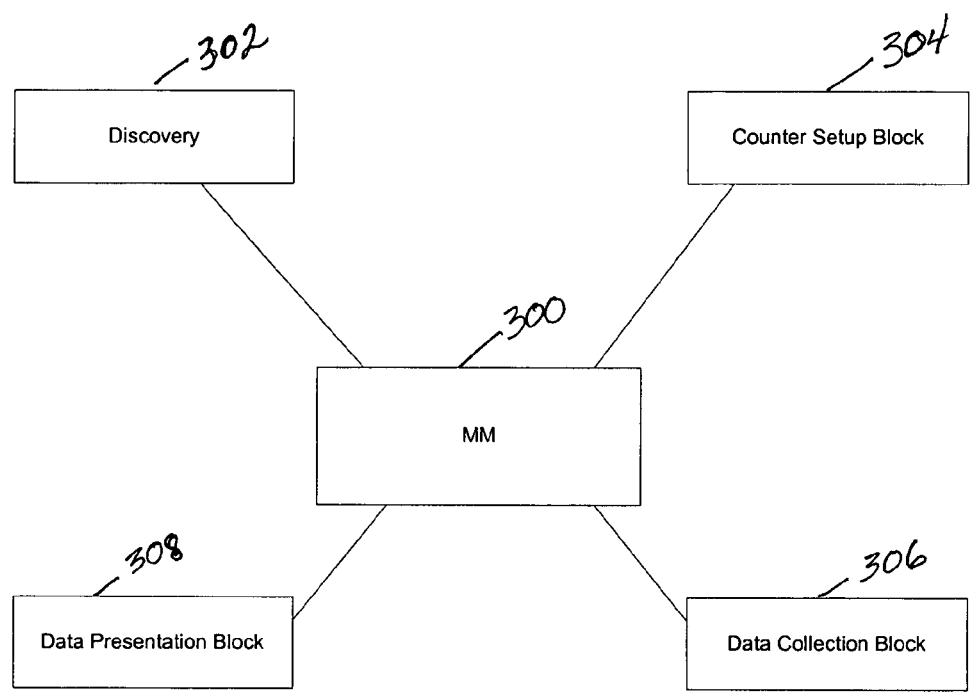
FIG. 3 shows a high level block diagram of the components of a management module installed within the management server.

Referring now to FIG. 3 of the drawings, there is shown a high level block diagram of the components of an MM 300, which is representative of one embodiment of the MM 104.1 of FIG. 1. As will be seen, the MM 300 includes a discovery thread or block 302, a counter setup block 304, a data collection block 306, and a data presentation block 308.

The discovery block 302 automatically discovers and reports to the MM 300 (a) all performance objects on the various hosts/filers 102 within the network architecture 100, (b) all instances of the performance objects, and (c) all counters associated with said instances. In one embodiment, in order to perform the above-described steps (a) to (c), each host 102 includes a set of Application Program Interfaces (APIs) to discover and report the objects, instances and counters to the MM 300. In one embodiment, the MM 300 may poll or query each host 102 to obtain the information on the performance objects, instances of the performance counters, and counters associated with the instance, using the APIs. In one embodiment, the APIs may include an agent to read a configuration file for each host in order to obtain information about the performance objects, instances, and counters that form part of the host and to report this information to the MM 300. In one embodiment, the agent may be configured to automatically report changes in the performance objects for a given host to the MM 300 whenever they occur. For example, if a new instance of a performance object is added to a host then this event is automatically reported to the MM 300. Alternatively, if an existing instance of a performance object is removed from a host, then this event is also reported to the MM 300. In one embodiment, the agent may be configured using SNMP traps.

Figure 3A:
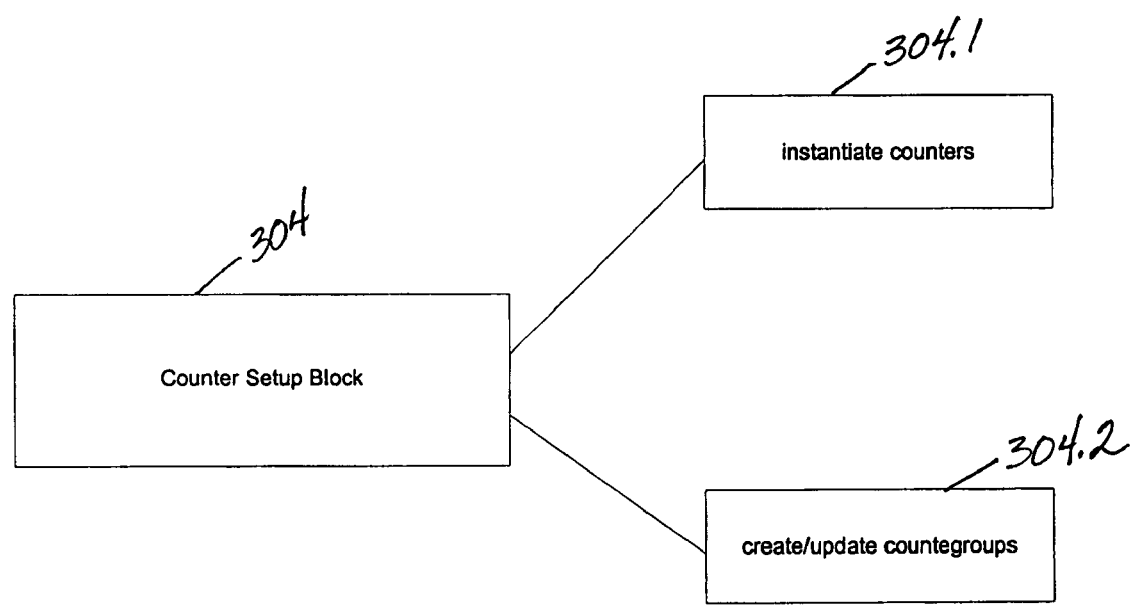

Referring now to FIG. 3A of the drawings it will be seen that the counter setup block 304 includes a thread 304.1 to instantiate counters based on the information provided by the discovery thread 302 on the performance objects associated with a particular host. In order to instantiate the counters, the thread 304.1 uses predefined mappings (tuples) of performance objects. These predefined mappings are called counter group templates. The counter group templates are stored in the database 104.2. An example of a counter group template is shown in FIG. 4 of the drawings, which contains a table that maps objects (e.g., CPU, disks, etc.) to counter names (e.g., CPU_busy, disk_kb_written, and disk_kb_read). In this example, the counter CPU_busy measures the load on a particular CPU, the counter name disk_kb_written provides an indication of the number of kilobytes written to a disk, whereas the counter disk_kb_read provides an indication of the number of kilobytes read from a particular disk. A counter group template may also specify a sample buffer size, a sample period, and name for the counter group template. The sample buffer size specifies how long to keep sampled counter values in stable storage. The sample period specifies a period at which an instantiated counter is to be sampled.

Shown below is an example of an algorithm, in pseudocode, that may be used to instantiate the counters:

Algorithm to Instantiate Counters:
for each (object, counter) in counter group template;
for each (object, instance, counter) in filer;
if object in filer matches object in counter group template;
and counter in filer matches counter in database,
then instantiate counter and insert into list.

An instantiated counter is also known as a fully qualified counter since information on which counter of which instance of which object, of which filer/host is completely known. Thus, the output of instantiating the counters at block 304.1 is a fully qualified counter which has the path: filer(host)/object/instance/counter name.

Referring to FIG. 3, at block 304.2, the counter setup block 304 creates and/or updates counter groups. A counter group is a group of instantiated or fully-qualified counters. In one embodiment, a counter group includes the following elements: (1) one or more fully qualified counters, (2) a sample period at which the fully qualified counter is to be sampled, (3) a counter group name, and (4) one or more file names into which data sampled from the fully qualified counter is to be written. A counter group may also include a sample buffer size that specifies how long to keep counter values in stable storage.

Figure 3B:
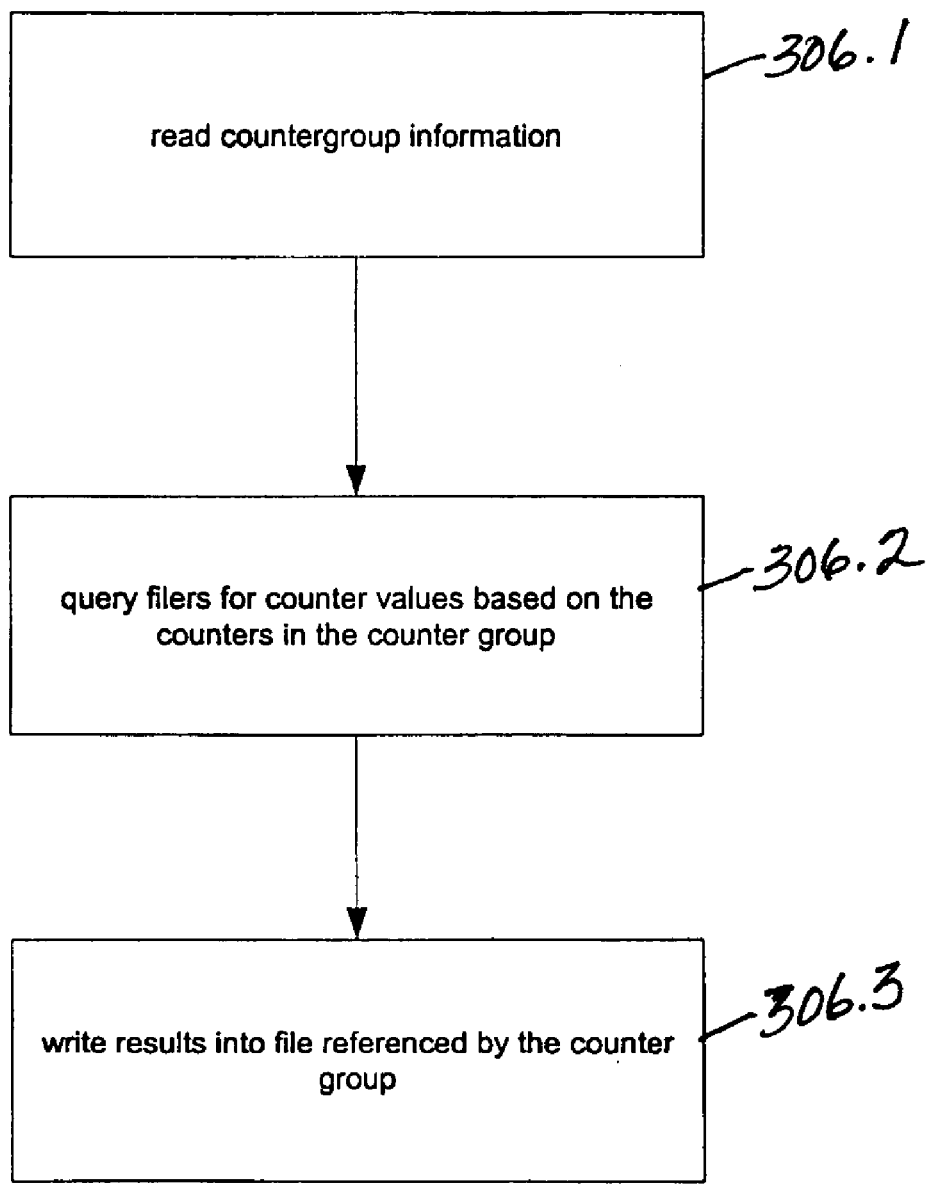

Referring now to FIG. 3B, there is shown a flowchart of operations performed by the data collection block 306 in order to collect data for each of the counters set up in the counter setup block 304. Referring to FIG. 3B, at 306.1 for each counter group, the MM 300 reads the counter group information. At block 306.2, the MM 300 queries the filers for counter values based on the counter group information. In one embodiment, the MM 300 maintains a priority queue in which a number of data collection threads are arranged in a heap sorted by time. When the time for executing each thread arrives, the MM 300 de-queues the thread from the heap and places the thread in a work queue. The MM 300 periodically de-queues each thread from the work queue and executes the thread. As a result of executing the threads in the work queue, performance data is obtained from the filers and inserted into the file referenced by the counter group. At block 306.3, the MM application writes the results of the queries into the file referenced by the counter group.

In one embodiment, the data collected by the data collection block 306 is stored in one or more flat files. In some cases, the data collected from the counters may be stored on a per filer/host basis. Thus, referring to FIG. 1, all counter group data collected from filer 1 is stored separately from all counter group data collected from filer 2. Under this file storage scheme, if, for example, filer 2 has failed and is non-operational for some reason, then the collection of data from filer 1 is unaffected. Further, under this file storage scheme, advantageously, data collection can proceed even though a counter group is being updated or changed. Thus, data collection and order of discovery of the performance objects can occur in parallel.

Figure 3C:
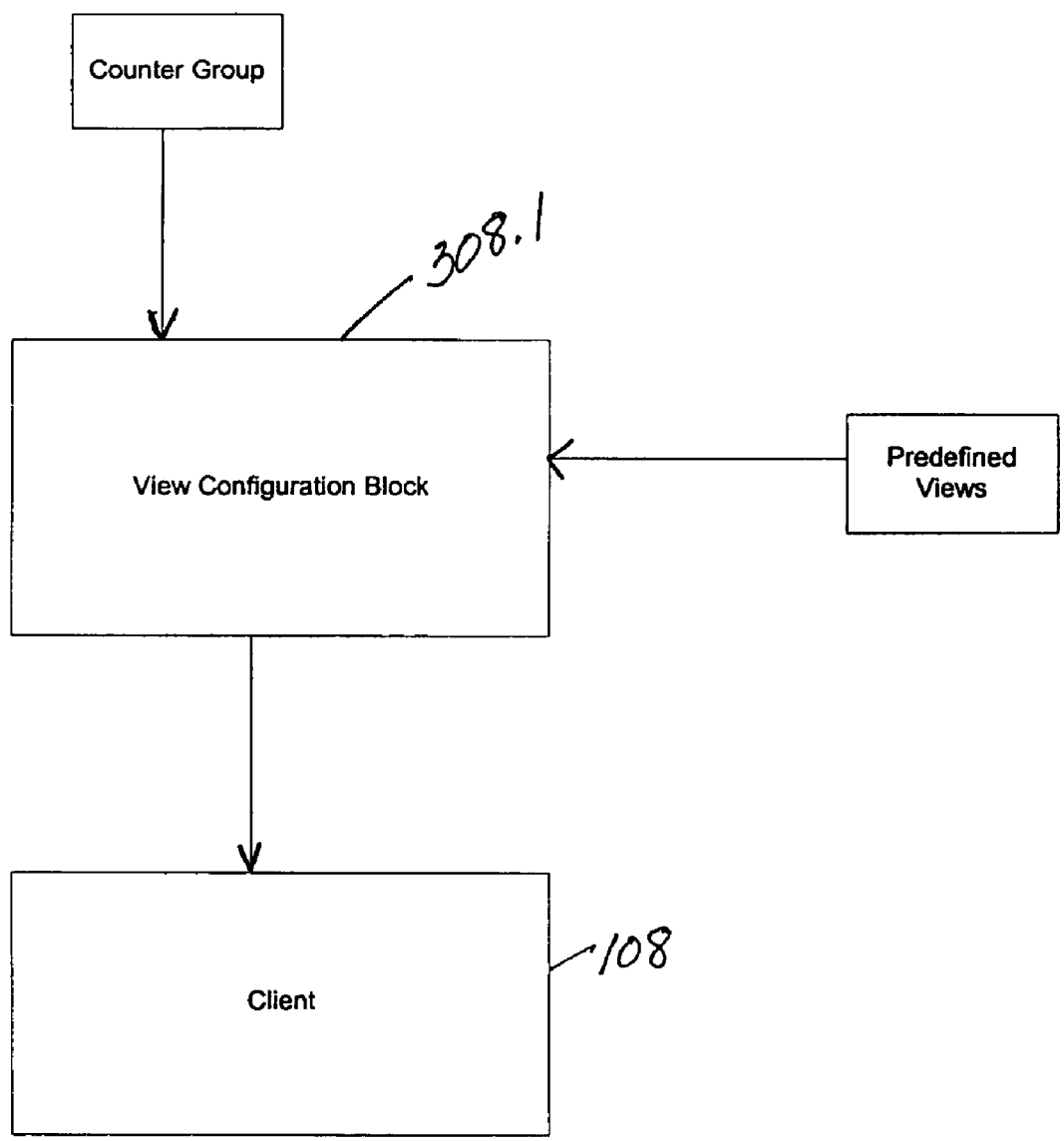

FIG. 3C of the drawings illustrates the components of the data presentation block 308 of the MM 300, in accordance with one embodiment. Referring to FIG. 3C, it will be seen that data presentation block 308 includes a view configuration block 308.1. The view configuration block 308.1 receives input from a user selecting a predefined view associated with one or more counter groups. In response, the view configuration block 308.1 retrieves the predefined view from the database 104.2 and sends the performance data for the counter group and the selected predefined view to the client, where the performance data is presented to a system administrator in accordance with the predefined view. For example, in one embodiment, the performance data and the predefined view may be sent as a markup language document. In another embodiment, the client may request the predefined view from the MM 300. After receiving the predefined view, the client retrieves data for the counters in the predefined view at a given rate set by the client.

Referring to FIG. 5 of the drawings, reference numeral 500 generally indicates hardware that may be used to implement the hosts 102, the clients 108, or the management server 104. The hardware 500 typically includes at least one processor 502 coupled to a memory 504. The processor 502 may represent one or more processors (e.g., microprocessors), and the memory 504 may represent random access memory (RAM) devices comprising a main storage of the hardware 500, as well as any supplemental levels of memory e.g., cache memories, non-volatile or back-up memories (e.g. programmable or flash memories), read-only memories, etc. In addition, the memory 504 may be considered to include memory storage physically located elsewhere in the hardware 500, e.g. any cache memory in the processor 502, as well as any storage capacity used as a virtual memory, e.g., as stored on a mass storage device 510.

The hardware 500 also typically receives a number of inputs and outputs for communicating information externally. For interface with a user or operator, the hardware 500 may include one or more user input devices 506 (e.g., a keyboard, a mouse, etc.) and a display 508 (e.g., a Cathode Ray Tube (CRT) monitor, a Liquid Crystal Display (LCD) panel).

For additional storage, the hardware 300 may also include one or more mass storage devices 510, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware 500 may include an interface with one or more networks 512 (e.g., a local area network (LAN), a wide area network (WAN), a wireless network, and/or the Internet among others) to permit the communication of information with other computers coupled to the networks. It should be appreciated that the hardware 500 typically includes suitable analog and/or digital interfaces between the processor 502 and each of the components 504, 506, 508 and 512 as is well known in the art.

The hardware 500 operates under the control of an operating system 514, e.g., the operating system 104.3, and executes various computer software applications 516 (e.g., the MM 104.1), components, programs, objects, modules, etc. (e.g. a program or module which performs operations described above). Moreover, various applications, components, programs, objects, etc. may also execute on one or more processors in another computer coupled to the hardware 500 via a network 512, e.g. in a distributed computing environment, whereby the processing required to implement the functions of a computer program may be allocated to multiple computers over a network.

In general, the routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of signal bearing media (computer-readable media) used to actually effect the distribution. Examples of signal bearing media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Although embodiments of the invention have been described with respect to storage devices, it should be borne in mind that those embodiments apply in general to any processing system or computer. Thus, for example, the MM application described above may be used to collect performance information from any remote device/host that supports the APIs to report information on performance objects, instances of the performance objects, and counters associated with the instances in accordance with the above described techniques.

What is claimed is:

1. A method, comprising:
within a network storage management server, automatically discovering a plurality of counters that collects data describing activity of a plurality of performance objects within a host offering networked storage services to a set of clients over a network; wherein the performance objects are physical subsystems of the host;
defining a counter group template for collection of the data describing the activity of the performance objects;
collecting the data for the performance objects from the counters in the counter group template; and
storing the data into a file in a storage medium.

2. The method of claim 1, wherein automatically discovering the counters comprises automatically discovering the performance objects, instances of the performance objects and counters associated with the instance of the performance objects for the host.

3. The method of claim 2, further comprising instantiating the selected counters based on a predefined mapping of the performance objects to the counter.

4. The method of claim 1, wherein there are two or more counters and there are two or more performance objects, further comprising storing the collected data for the counters in two or more counter group templates separately for the host.

5. The method of claim 1, further comprising receiving a user selected one of a plurality of predefined views, each view defining how to organize the data for presentation.

6. The method of claim 5, further comprising presenting the data to the user, in accordance with the selected view.

7. The method of claim 1, wherein the automatic discovering, and the data collecting are performed in parallel.

8. A method, comprising:
within a network storage management server, receiving a user selected counter group template defined for a plurality of counters, the counters collecting data describing activity of a plurality of performance objects within a host offering networked storage services to a set of clients over a network; wherein the performance objects are logical subsystems of the host;
instantiating the at least one counter to collect data from the one or more performance objects;

collecting data for the plurality of counters; and storing the collected data into a file in a storage medium.

9. The method of claim 8, further comprising receiving a user selected predefined view containing a configuration for how the collected data should be presented.

10. The method of claim 9, further comprising presenting the collected data based on the predefined view.

11. A computer readable medium, having stored thereon a sequence of instructions, which when executed by a computer, cause the computer to perform a method comprising:

within a network storage management server, automatically discovering a plurality of counters describing activity of a plurality of performance objects within a host offering networked storage services to a set of clients over a network; wherein the performance objects are physical subsystems of the host;

defining a counter group template including counters for the performance objects;

collecting data for the counters into the counter group template; and storing the data into a file in a storage medium.

12. The computer readable medium of claim 11, wherein automatically discovering the counters comprises automatically discovering the performance objects and the counters associated with the performance objects for the host.

13. A computer readable medium, having stored thereon a sequence of instructions, which when executed by a computer, cause the computer to perform a method comprising:

within a network storage management server, receiving a user selected counter group template mapping a plurality of counters to a plurality of performance objects within a host offering networked storage to a set of clients over a network; wherein the performance objects are logical subsystems of the host;

instantiating the plurality of counters to collect data from the performance objects;

collecting data for the plurality of counters; and storing the collected data into a file in a storage medium.

14. The computer readable medium of claim 13, wherein the method further comprises receiving a user selected predefined view containing a configuration for how the collected data should be presented.

15. The computer readable medium of claim 13, wherein the data is collected at a predefined sampling rate.

16. A network storage management server, comprising:

a processor; and a memory coupled to the processor, the memory storing instructions which when executed by the processor cause the network storage management server to perform a method comprising:

automatically discovering a plurality of counters describing activity of performance objects within a host offering networked storage to a set of clients over a network; wherein the performance objects are physical subsystems of the host;

defining a counter group template;

collecting data for the counters into the counter group template; and storing the data into a file in a storage medium.

17. The storage device of claim 16, wherein automatically discovering the counters comprises automatically discovering the performance objects and the counters associated with the performance objects.

18. A network storage management server, comprising:

a processor; and a memory coupled to the processor, the memory storing instructions which when executed by the processor, cause the network storage management server to perform a method comprising:

receiving a user selected counter group template defined for a plurality of counters, the counters collecting data describing activity of a plurality of performance objects within a host offering networked storage to a set of clients in a network; wherein the performance objects are logical subsystems of the host;

instantiating the counters to collect data from the plurality of performance objects;

collecting data for the counters; and storing the collected data into a file in a storage medium.

19. The storage device of claim 18, wherein the method further comprises receiving a user selected predefined view containing a configuration for how the collected data should be presented.

20. The storage device of claim 18, wherein the data is collected at a predefined sampling rate.

21. A method comprising:

within a network storage management server, using a plurality of counters to monitor the activity of a plurality of performance objects that are physical subsystems of a host offering networked storage services to a set of clients over a network, the counters producing data describing the activity of the performance objects;

discovering the counters and collecting the data describing the activity of the performance objects into a counter group template defined to collect the activity of the performance objects; and storing the data into a file in a storage medium.

22. The method of claim 21, further comprising creating a counter group comprising the plurality of counters, a sample period, and a sample buffer size.

23. The method of claim 21, wherein the sampling is in accordance with the sample period.

24. The method of claim 21, further comprising displaying sample data for the plurality of counters using a view associated with the plurality of counters, the view containing a configuration for presenting the collected data.

* * * * *

UNITED STATES PATENT AND TRADEMARK OFFICE
CERTIFICATE OF CORRECTION

PATENT NO.       : 7,657,617 B1
APPLICATION NO. : 10/802542
DATED            : February 2, 2010
INVENTOR(S)      : Roussos et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1288 days.

Signed and Sealed this

Thirtieth Day of November, 2010

David J. Kappos
*Director of the United States Patent and Trademark Office*